United States Patent [19]

Comins et al.

[11] Patent Number: 5,047,958

[45] Date of Patent: Sep. 10, 1991

[54] LINEAR ADDRESS CONVERSION

[75] Inventors: Todd R. Comins, North Chelmsford; Willem A. H. Engelse, Townsend, both of Mass.

[73] Assignee: Digital Equipment Corporation, Maynard, Mass.

[21] Appl. No.: 366,859

[22] Filed: Jun. 15, 1989

[51] Int. Cl.[5] ........................ G06F 12/10; G06F 3/14; G09G 1/02

[52] U.S. Cl. .................................. 364/521; 364/518; 340/799

[58] Field of Search ................ 364/521, 518; 340/798, 340/799, 802, 750, 721

[56] References Cited

U.S. PATENT DOCUMENTS

| | | | |
|---|---|---|---|
| 4,553,206 | 11/1985 | Smutek et al. | 364/300 |
| 4,642,790 | 2/1987 | Minshull et al. | 364/900 |
| 4,653,020 | 3/1987 | Cheselka et al. | 364/900 |
| 4,672,369 | 6/1987 | Preiss et al. | 340/728 |
| 4,677,431 | 6/1987 | Lee | 340/728 |
| 4,700,182 | 10/1987 | Ohgami | 340/750 |
| 4,704,697 | 11/1987 | Kiremidjian et al. | 364/518 |
| 4,707,690 | 11/1987 | Higuchi | 340/750 |
| 4,710,767 | 12/1987 | Sciacero et al. | 340/799 |
| 4,742,474 | 5/1988 | Knierim | 364/521 |
| 4,757,310 | 7/1988 | Katsura et al. | 340/798 |
| 4,769,636 | 9/1988 | Iwani et al. | 340/724 |
| 4,791,580 | 12/1988 | Sherrill et al. | 364/521 |
| 4,868,557 | 9/1989 | Perlman | 340/799 |
| 4,912,658 | 3/1990 | Sfarti et al. | 364/521 |
| 4,945,499 | 7/1990 | Asari et al. | 364/521 |

*Primary Examiner*—David L. Clark
*Assistant Examiner*—Raymond J. Bayerl
*Attorney, Agent, or Firm*—Cesari and McKenna

[57] ABSTRACT

A graphics subsystem (10) employs an image memory (12) that includes an on-screen part (44) and an off-screen part (46). The locations of the on-screen memory (44) are continually scanned to provide data to be displayed on a display device (16). The off-screen part (46) stores data that represent image segments that have been occluded by windowing. To transfer data between the on-screen part (44) and the off-screen part (46), an address generator (24) generates a sequence of two-dimensional addresses representing the two-dimensional positions of the pixels whose data are to be transferred. These addresses are converted to one-dimensional addresses by a simple circuit consisting of multiplexers (26 and 28), adders (30 and 32) and a multiplier (34).

8 Claims, 3 Drawing Sheets

LINEAR ADDRESS CONVERSION

BACKGROUND OF THE INVENTION

The present invention concerns computer graphics and particularly the generation of memory addresses for the image memory in a graphics system.

The advance in computer technology has been such that users of workstations and even individual personal computers now routinely have at their command enough computer power to operate many computer applications concurrently. This capability has proven extremely useful because many tasks that a computer can aid a human in performing require that the human user direct his attention concurrently to the results of a number of computer applications. For this reason, "windowing" capabilities have enjoyed significant popularity. In windowing, various subsections of the computer's display screen are allocated to displaying the results of different applications. The allocation occurs dynamically; the user "opens" and "closes" different numbers of windows at different times, so the number and positions of the windows can change within a session. Typically, a user can open a window while retaining a previously used window on the screen. In such a situation, the new window often "overlaps" the old window so that a section of the old window is occluded. Users also can typically "pop" an occluded window to the top of the priority order so that it can be viewed in its entirety. This occludes part of the previously occluding window.

Although the user cannot see an occluded segment, the computer typically must still retain the contents of the occluded segment in some off-screen memory so that it can be recalled when the previously occluded segment should again become visible. For performance reasons, some graphics subsystems provide more of the fast, dedicated image memory than is required to refresh the display. It is desirable to be able to use this excess image memory as off-screen memory.

In the more-sophisticated systems, however, large numbers of windows can be active simultaneously, and large numbers of occluded segments of many different shapes and sizes can thus be created. In such systems, the required storage for occluded segments can exceed the capacity of off-screen memory. When the off-screen-memory capacity has been exceeded, data must be offloaded into some back-up memory, such as system memory or some mass-storage device (e.g., magnetic media), and significant performance penalties are incurred. Since the cost of providing large amounts of off-screen memory is high, the efficiency with which that memory is utilized is a significant design consideration.

Much of the off-screen-memory size requirement results from the fact that the occluded segments come in many shapes and sizes, and because of this variety the occluded segments do not fall into an efficient storage arrangement in the off-screen memory. Computer programs for storing occluded segments therefore usually employ some type of technique for arranging the different-shaped segments in such a manner as to increase the efficiency in the storage process; like the amount of different-sized objects that can fit in a given-sized box, the amount of occluded segments that can be stored in a given-sized memory depends on the way in which they are arranged.

Even the most-efficient arrangement of integral occluded segments within the off-screen memory, however, usually leaves a fairly large amount of that memory unusable. For this reason, workers have employed "tiling" routines, which break each occluded segment into smaller segments, or "tiles." Tiles can be stored more efficiently than the larger occluded segments can be. Unfortunately, the algorithmic delay imposed by tiling can make it too slow a process for some of the more demanding graphics operations.

SUMMARY OF THE INVENTION

The present invention increases the efficiency of off-screen-memory use but avoids the complexity with which tiling processes are afflicted. The present invention achieves efficiency by storing image data one-dimensionally in the off-screen memory: the two-dimensional arrangement of locations in the occluded on-screen segment is converted into a one-dimensional form by, for example, concatenating successive rows of pixels to make a single long sequence. The normal two-dimensional (x,y) address of a pixel within the occluded space thus is converted to a one-dimensional "address," which is simply the serial position of the pixel in a scan of the occluded on-screen segment.

To store the data from the occluded segment, one begins at any chosen starting point in the off-screen memory and writes the data, in the sequence determined by their one-dimensional addresses, in locations whose sequence is that of a scan of the off-screen memory. That is, when the storage operation reaches the end of an off-screen memory row (in the case of a conventional horizontal scan), it continues at the beginning of the next row, regardless of whether the pixel for which data are being stored in the new off-screen row was actually located in a new row in the occluded segment. The shape of the off-screen memory segment into which the data are stored is thus independent of the shape of the corresponding on-screen segment, so off-screen memory space can be allocated efficiently. This approach is additionally quite simple to implement in hardware, so it facilitates avoiding the algorithmic delay that characterizes tiling approaches.

BRIEF DESCRIPTION OF THE DRAWINGS

These and further features and advantages of the present invention are described by reference to the accompanying drawings in which.

DETAILED DESCRIPTION OF THE ILLUSTRATED EMBODIMENT

Figure 1:
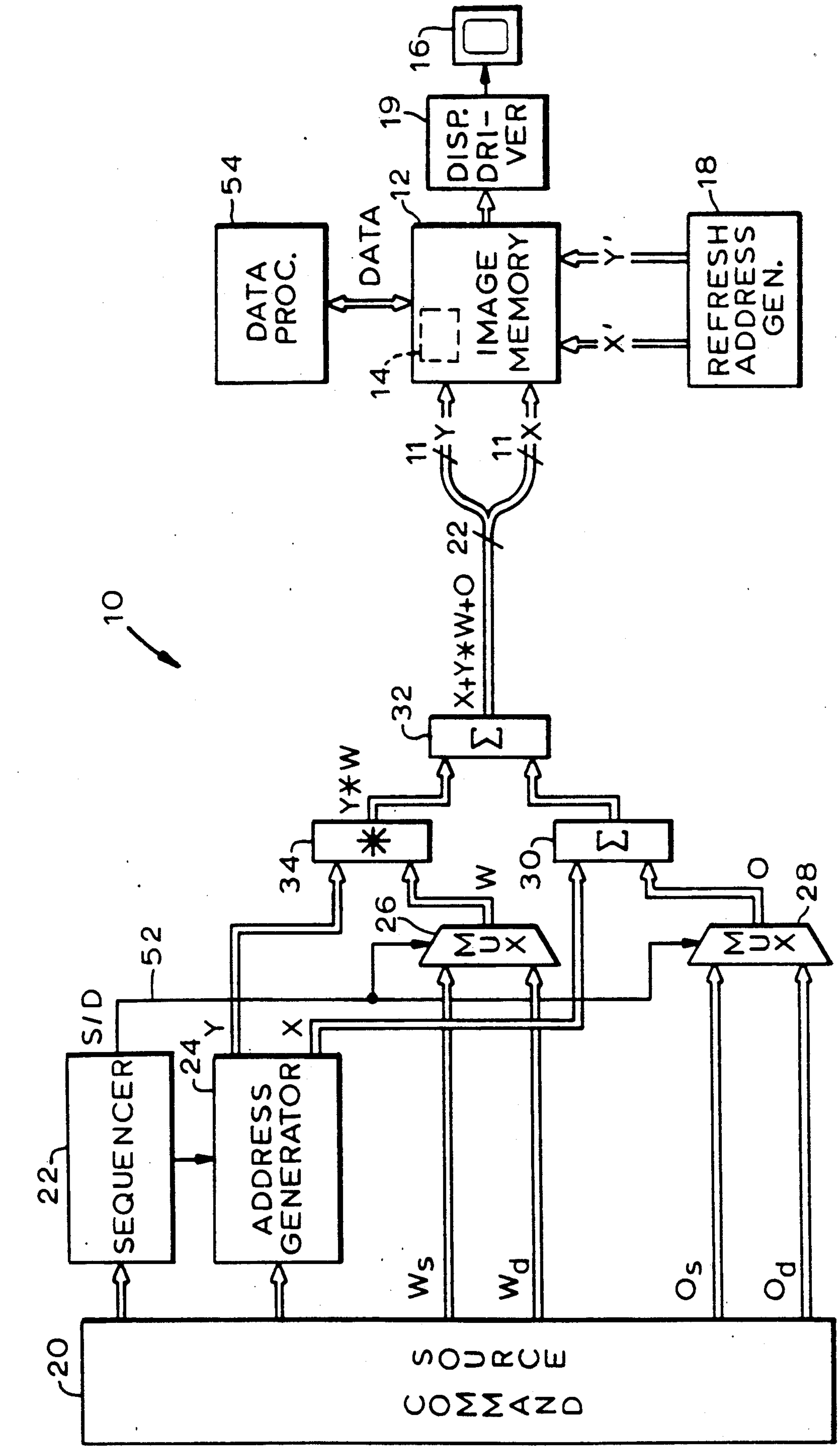
FIG. 1 is a block diagram of a graphics system employing the teachings of the present invention.

FIG. 1 depicts a graphics subsystem 10 that employs the teachings of the present invention to perform non-refresh-type data transfers with an image memory 12, which contains an on-screen part 14 whose contents represent the image to be displayed on a display device 16. The display device 16 is typically a cathode-ray-tube-type device, which has a screen across which an electron beam is repetitively swept in the conventional raster-scan fashion. The on-screen part 14 is a two-dimensional array of memory locations corresponding to the two-dimensional array of picture elements (pixels) on the display device 16. A refresh-address generator 18 applies addresses to the memory 12 in a sequence that corresponds to the movement of the electron beam across the screen so that display-driver circuitry 19 can use the resultant output of the image memory 12 to modulate the intensity of the electron beam. The display driver 19 typically includes at least one digital-to-analog converter (three in the case of a color monitor) and may also include look-up tables that perform gamma correction and/or implement the color palette currently in effect.

Between image-memory accesses for this refresh operation, the image memory 12 can be accessed for purposes such as to update or modify the contents of the image memory so that new data can be displayed or to read the contents of selected on-screen-memory locations and store them in an off-screen memory so that the selected on-screen-memory locations can be overwritten without permanent loss of their contents. A single image memory 12 serves both as the on-screen memory and as the off-screen memory in the illustrated embodiment; i.e., the on-screen and off-screen memories receive the same address signals. As will become apparent, this arrangement is convenient, but the teachings of the present invention can also be implemented in a system in which the on-screen and off-screen memories are separate.

The storage process begins when a command source 20, a sequencer 22, and an address generator 24 produce signals that represent the two-dimensional addresses of the selected locations in the on-screen section 14. The command source 20 produces relatively high-level instructions. Part of an example of a command source 20 will be described in connection with FIG. 4, but the command source 20 can be any of a large variety of combinations of hardware and software typically employed for this purpose. A high-level instruction may, for instance, include a beginning address and a request that a rectangle of a certain size be written on the display in a position starting at the beginning address, but it may give no specific addresses of the pixels in the rectangles. The address generator 24 would then compute the addresses of those pixels under the control of the sequencer 22.

The present invention concerns the translation of these addresses to addresses in off-screen memory. In the illustrated embodiment, this function is performed by a combination of two multiplexers 26 and 28, two adders 30 and 32, and a multiplier 34. Through the use of this simple circuitry, the apparatus of the present invention avoids the source of much of the storage inefficiency of some previous approaches without imposing the computational complexity with which others are afflicted. In previous approaches, the translation between an on-screen address and the corresponding off-screen address ultimately involves adding offsets to the on-screen row and column addresses to find the corresponding off-screen row and column addresses; i.e., these approaches treat the addresses as two-dimensional throughout the translation operation. As a consequence, the shape of the off screen segment depends on that of the on-screen segment, and this contributes to storage inefficiency.

In contrast, we convert the two-dimensional address to a one-dimensional address before making the translation and then convert back to a two-dimensional address after the translation. By doing this, we make the shape of the off-screen segment independent of that of the on-screen segment so that data from occluded segments can be stored efficiently. Moreover, we perform these conversions in circuitry that is very simple and fast so that we do not encounter the algorithmic delay that tiling approaches can impose.

Specifically, the illustrated embodiment assigns an order to the addresses of the pixels in a rectangular occluded segment whose values are to be stored off screen—i.e., it converts the two-dimensional addresses to one-dimensional addresses—by simply multiplying the y coordinate by the width of the rectangle and adding the x coordinate to the result. Since the y coordinate is multiplied by the width of only the on-screen segment, not of the entire on-screen memory, the resultant one-dimensional addresses of the pixels in only the on-screen segment together form a sequence of consecutive integers such that the one-dimensional address of a pixel is its serial position (possibly, as will be seen, with a fixed offset) in a row-by-row scan of only the on-screen segment—i.e., not in a scan of the entire memory.

The translation to the off-screen address occurs in the one-dimensional domain through the addition of an offset to the one-dimensional on-screen address to produce a one-dimensional off-screen address. Although the translation from the one-dimensional on-screen address to the one-dimensional off-screen address conceptually follows the conversion from the two-dimensional on-screen address to the one-dimensional on-screen address, the two processes are intermingled in the illustrated embodiment; multiplier 34 multiplies the y component by the width of the occluded on-screen segment, but adder 30 adds the offset to the x component before adder 32 adds the result to the product produced by multiplier 34.

In the illustrated embodiment, the second conversion, from the one-dimensional off-screen address to the two-dimensional off-screen address, is performed even more simply than the first is. In principle, the conversion involves dividing the one-dimensional address by the width of the off-screen-memory—i.e., in the illustrated embodiment, by the width of the entire image memory 12—and using the quotient as the y component and the remainder as the x component. The adder output is thus treated a one-dimensional off-screen address in a sequence of such addresses that together represent, not a segment whose width is that of the on-screen segment or some fraction thereof, but rather a segment whose width is that of the entire off-screen memory. As a result, the circuitry establishes a correspondence between the on-screen-segment locations and off-screen-memory locations that together form an off-screen segment whose shape is independent of that of the on-screen segment.

In practice, division by the memory width can be accomplished by simply using the most-significant bits of the one-dimensional memory as the y component and using the least-significant bits as the x component if the width of the off-screen memory is a power of two. The width of the image memory is $2^{11}$ in the illustrated embodiment, so it employs the eleven most-significant bits of the adder-32 output as the y component and uses the other eleven bits as the x component.

The approach of the present invention can thus be realized in circuitry that is not only very simple but also capable of performing other operations required in the storage process, as will be described below.

Of course, the illustrated embodiment is not the only approach to implementation of the present invention; many other arrangements are possible. For example, an equally simple first conversion process would be to multiply the x component by the height of the on-screen segment and add the y component to the result. The resultant one-dimensional address of each pixel would give its position in a column-by-column scan, rather than in a row-by-row scan, of the occluded on-screen segment, but the type of scan—horizontal, vertical, diagonal, or any other—does not matter in principle so long as it results in an ordered scan of all of the segment locations. In practice, horizontal or vertical scans are preferable because they are usually easier to implement.

Figure 2:
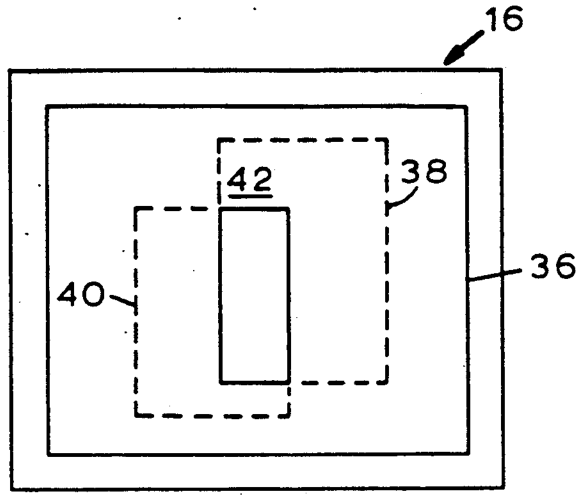
FIG. 2 is a diagram depicting windows in the display of FIG. 1.

The manner in which the circuitry of FIG. 1 converts the on-screen addresses to off-screen addresses and performs other functions will now be described in more detail in connection with an example of storing occluded-segment data into an off-screen memory segment. FIG. 2 shows the display device 16 and its screen 36, on which a complete image representing the output of a first applications program is initially displayed. This output is displayed in a first "window," which occupies the entire screen.

The results of another applications program are to be displayed at the same time, so a second window 38 is opened. The image data that were previously displayed in the segment that window 38 now occupies are transferred to the off-screen part of the image memory 12, and the image data representing the output of the second applications program are displayed in window 38.

The example of the circuit operation will concentrate on what happens when a third window 40 is created to lie over the second window 38 so that an occluded segment 42 of the second window 38 requires storage in a segment of the off-screen part of the memory 12.

Figure 3:
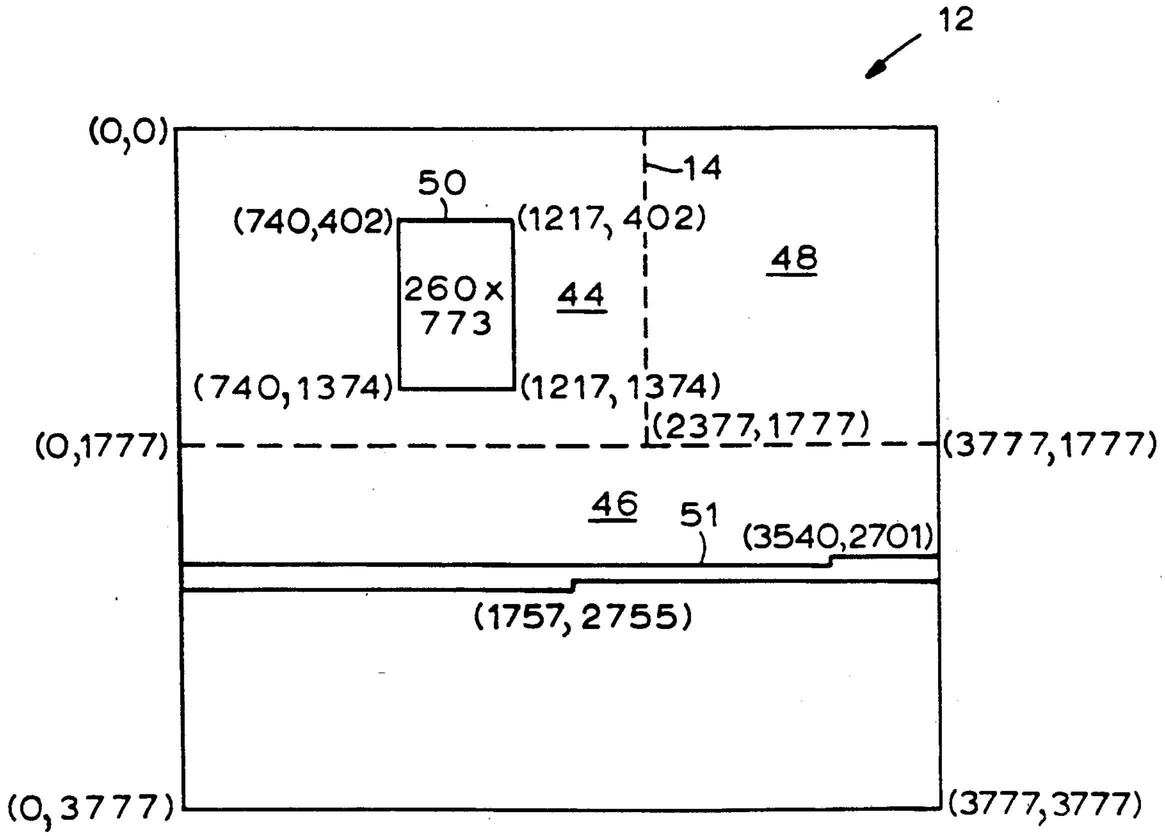
FIG. 3 is a diagram of the address space of the image memory of FIG. 1.

FIG. 3 represents the address space of the image memory 12. As FIG. 3 indicates, the image memory is a 2K×2K array of memory locations, the location at the upper left having coordinates (0, 0) and the location in the lower right having coordinates (3777, 3777) in octal notation. The on-screen part 14 is a 1280×1024 array (2400'2000 in octal) in the upper left of the memory 12. The display 16 continually displays the image represented by data that the on-screen part 14 currently contains. The lower half 46 of the image memory 12 is used for off-screen storage, while a part 48 in the upper right contains other data not relevant to the present invention.

For the purposes of this example, we will assume that the data in display segment 42 about to be occluded are contained in a 260×773 on-screen segment 50 having the octal coordinates shown in FIG. 3. (These and all subsequent memory addresses and dimensions will be given in octal notation.) Rather than store these data in a similar, 260×773 off-screen segment, however, the circuitry of the present invention stores them one-dimensionally, starting at some point in a scan pattern of the off-screen memory (i.e., the image memory 12 in the illustrated embodiment) and following that pattern until all of the data are transferred. In the illustrated embodiment, the scan is a row-by-row scan. That is, the data are read into an off-screen segment 51 beginning at, say, location (3540, 2701), extending through rows 2702 through 2754, and ending at location (1757, 2755).

By storing the data in this manner, off-screen memory space can be employed more efficiently because it is allocated independently of the shape of the memory segment represented by the data to be stored. To accomplish this result, the circuitry of FIG. 1 converts two-dimensional addresses to one-dimensional addresses, as will now be explained.

The command source 20 commands the sequencer 22 to operate the address generator 24 so as to produce in sequence the conventional two-dimensional addresses of the 260×773 segment about to be occluded. The address generator 24 generates those addresses in a sequence that progresses in the order of a horizontal scan of that segment: (740, 402), (741, 402), . . . , (1217, 402), (740, 403), . . . , (1217, 1374).

This sequence, which represents the locations to be accessed in the on-screen memory, results when the command source 20 has given the address generator the absolute starting address (740, 402) of the on-screen segment to be occluded. In the alternative, the command source 20 could direct the sequencer 22 to cause the address generator to generate addresses for a 260×773 array but give the address generator a starting address of (0, 0) so that the result addresses would be relative, not absolute, addresses. In such a case, the sequence would be (0, 0), (1, 0) . . . , (257, 0), (0, 1), . . . , (257, 772).

In either case, multiplier 34 and adders 30 and 32 use each of these two-dimensional addresses to generate both a source address and a destination address—i.e., both the address of a location in the on-screen segment 50 containing data to be read and the address of a location in the off-screen segment 51 into which the data are to be stored. To generate the destination address, these circuit elements perform the translation process mentioned above, and the resultant address is used to store the data in the off-screen memory. Before the data are stored, however, they must be fetched, and for this purpose these circuit elements perform another process, in which the translation, if any, is two-dimensional, not one-dimensional.

Specifically, each time the address generator 24 generates a new two-dimensional address, the sequencer 22 first sets an S/D (source/destination) signal on line 52 to its source-indicating level. This level causes multiplexer 26 to forward, as its output W, a source width $W_s$, which is one of two parameters $W_s$ and $W_d$ that the command source 20 supplies to multiplexer 26.

Parameters $W_s$ and $W_d$ represent memory-array widths. For the operation involved here, the source width $W_s$ represents the number of locations in a row of the entire memory 12 while the destination width $W_d$ represents the number of locations in a row of the occluded on-screen segment 50 only. When the S/D signal indicates the source mode, multiplexer 26 forwards $W_s$—i.e., the total-memory width, 4000—to the multiplier 34, which multiplies it by the y component of the address that address generator 24 has generated. Simultaneously, multiplexer 28 forwards to summing circuit 30 as its output O another parameter, the on-screen, or source, offset value $O_s$, supplied by the command source 20. The source offset value $O_s$ represents the difference between the addresses that the address generator 24 generates and the absolute addresses of the locations actually to be addressed in the on-screen segment 50. If the command source 20 has supplied the actual starting location (740, 402) to the address generator, there is no difference between the outputs of the address generator 24 and the corresponding addresses in the occluded on-screen segment 50, and the value of $O_s$ is zero. However, if the command source 20 instead requests that the address generator 24 generate relative addresses, there is a non-zero fixed offset between the intended addresses and the output of the address generator 24, and the command source 20 accordingly supplies this non-zero value of $O_s$.

$O_s$ represents this offset in a one-dimensional form rather than in a two-dimensional form. In the one-dimensional form, all locations are addressed by their serial positions in a scan of the memory. The two-dimensional address (0, 0) becomes the one-dimensional address 0; (3777, 0) becomes 3777; (1, 0) becomes 4000; and (740, 402), namely, the beginning address of the on-screen segment 50 representing the region to be occluded, becomes 2,010,740.

We will assume for the sake of demonstration that the command source 20 has directed the address generator 24 to generate relative addresses rather than absolute addresses. Consequently, the offset $O_s$ is 2,010,740 rather than 0. Adder 30 adds this offset to the x component of the output of the address generator 24, and adder 32 adds the result to the output of the multiplier 34. The output of adder 32 is a one-dimensional address of a location representing a pixel in the region 42 about to be occluded.

Consider, for example, location (740, 402) in the upper left corner of on-screen segment 50. The address of that location relative to on-screen segment 50—and thus the output of address generator 24—is (0, 0), so the output of adder 32 is simply the original offset value $O_s$. Had the command source 20 directed the address generator to start with address (740, 402)—and accordingly given the value of the offset $O_s$ as 0—the result would be the same, namely, 2,010,740; $4000\times402+70=2,010,740$. The system uses the eleven lower-order bits of this 22-bit one-dimensional address as the x component of a two-dimensional address, and it uses the eleven higher-order bits as the y component. The result is that the x component is 740 and the y component is 402; i.e., the resultant address is (740, 402), which is the absolute address of the beginning location in the occluded on-screen segment 50.

An address signal representing this address is applied to the image memory 12, and, by means of connections not shown, the sequencer 22 causes the image memory 12 to fetch the contents of the location thus addressed and write them into a data processor 54. For the purposes of the present invention, "data processor" 54 could simply be a latch circuit or, indeed, any access means; its purpose in the data-transfer operation is simply to store data fetched from one location in memory 12 and then return it to the memory 12 for writing into another location. Typically, however, the present invention will be embodied in a graphics system that has other capabilities, many of which require a certain amount of computation to be performed before data are rewritten into the memory. It is for this reason that we refer to the access means of block 54 as a "data processor."

With the data fetched from the memory and stored in data processor 54, the sequencer 22 changes the value of the S/D signal to its destination-indicating value, and the multiplexers 26 and 28 therefore forward destination width and offset values $W_d$ and $O_d$, respectively, instead of $W_s$ and $O_s$. As was stated before, $W_d$ is the width of the region to be occluded; in the example, $W_d=260$. The off-screen, or destination, offset $O_d$ is the value that the command source 20 uses to indicate the position of off-screen segment 51.

Like $O_s$, $O_d$ is a difference between one-dimensional addresses. We have assumed that the command source 20 causes the address generator 24 to generate relative, rather than absolute, addresses. In such a case, it supplies as the destination offset $O_d$ the serial position of the beginning location in off-screen segment 51. For the sake of example, we will assume that the beginning location is (3540, 2701), so the offset is 13,407,540. If the command source 20 instead directed the address generator to begin the addresses at the absolute beginning address of the on-screen segment 50, the destination offset $O_d$ would be the difference between the serial positions of the first location in the on-screen segment 50 and the first location in the corresponding off-screen segment 51.

In either case, the function of multiplier 34 is to contribute to the serial positions within a scan of on-screen segment 50 only. In a scan of the entire memory, the difference between the serial positions of locations in the same column but adjacent rows is equal to the width of the entire memory, but the difference between their serial positions in a scan of segment 50 alone is equal to the width of that region. For this reason, multiplexer 20 forwards $W_d$, namely, the width of segment 50, when the sequencer requests the destination mode. In computing the destination address, multiplier 34 multiplies the y coordinate by the width of on-screen segment 50, and adder 32 adds the resultant product to the adder 30 output, which represents the sum of the x coordinate and the linear address of the beginning location in off-screen segment 51. The result is the serial position of the location at which the data should be stored.

Regardless of which mode of operation is employed—i.e., of whether the on-screen-location address is relative or absolute—the sum is equal to a value that can be described as the sum of two addends. The first addend is the serial position of the subject on-screen-segment location in a scan of the on-screen segment 50. The second addend is a value that represents the first location in the off-screen segment 51 by that location's position in a scan of the off-screen memory. In the illustrated embodiment, the image memory 12 serves both as the off-screen memory and as the on-screen memory, so the second addend in this embodiment is the position of the beginning location in a scan of the image memory 12.

In the case of the data fetched from the upper-left occluded-region location, whose absolute address is (740, 402), the address generator 24 produces a relative address of (0, 0), so the output of multiplier 34 is 0. The output of adder 30 is the sum of the value of the x coordinate, namely, 0, and the destination offset $O_d$, which is also the serial position, in a scan of the entire image memory 12, of the first location in the off-screen segment 51. Therefore, the output of adder 32 is a twenty-two-bit representation of this serial position, which is divided into eleven-bit x and y components to yield (3540, 2701), the two-dimensional address of the first location in the off-screen segment 51.

With this address applied to the image memory 12, the sequencer causes the data processor 54 to generate as its output the data that it had just stored and causes the image memory 12 to store that output data in the addressed location. In this way, data representing the first pixel in the occluded region 42 is removed from the first location in the on-screen segment 50 and stored in the first location of the off-screen segment 51.

The sequencer 22 repeats this operation for each location in the on-screen segment 50 so that its entire contents are copied into the off-screen segment 51 and the contents of segment 50 can therefore be rewritten without loss of the original contents.

The circuitry of FIG. 1 is also useful for operations that involve less than all of the contents of an occluded segment and may not require access to the on-screen segment at all. Suppose, for example, that the applications program whose output is represented by window 38 needs to change its output. If some of the output to be changed is intended for segment 42, the new data must be stored into off-screen segment 51 rather than into on-screen segment 50.

The circuitry downstream of the address generator 24 relieves the command source of the need to compute the off-screen addresses explicitly. Instead, the command source 20 simply generates the proper width and offset parameters and then operates the address generator to generate addresses as though segment 42 were not occluded, and the remaining circuitry of FIG. 1 calculates the corresponding off-screen addresses automatically. In this situation, access to the on-screen segment is not necessary, so the multiplexers 26 and 28 stay in their destination modes. The command source 20 is required to keep track of only the widths of the different occluded segments and the addresses of the first locations of the off-screen segments in which they are stored; it does not need to compute individual off-screen addresses.

Note that the proper operation of the circuitry downstream of the address generator 24 does not depend on the address generator's providing addresses in any particular order. It therefore produces the proper results even if—as is common—the applications program changes its output selectively and in an essentially random order.

When the overlying window 40 is closed and the stored information must be restored to region 42 on the screen of display 16, the circuit of FIG. 1 is again employed in a manner generally the same as that in which it was used to store the data in the off-screen segment 51, with the exception that the values of the source width $W_s$ and source offset $O_s$ are switched with those of the destination width $W_d$ and destination offset $O_d$, respectively.

Specifically, the command source 20 operates the sequencer 22 and address generator 24 as before to scan through the addresses of a 260×773 array of memory locations. For each address, it places multiplexers 26 and 28 in the source mode first and then in the destination mode. Since the values of the parameters have been switched, however, the addresses first generated are those of the corresponding positions in the off-screen segment 51, and, in the first part of each cycle, the contents of one of these locations is fetched and stored by data processor 54. In the second part of each cycle, the sequencer 22 switches the multiplexers 26 and 28 to the destination mode, which, because of the switching of parameters, results in generation of corresponding addresses in the on-screen segment 50. In this way, the data previously stored in off-screen segment 51 are returned to the on-screen segment 50.

As was stated above, the command source 20 can operate the sequencer 22 and address generator 24 so as to produce either relative addresses—i.e., addresses in a coordinate system in which the upper left-hand corner of the occluded region has address (0, 0)—or absolute addresses, in which the addresses produced are the actual addresses of the locations that the image data occupy in the image memory 12 when the on-screen segment is not occluded. In the foregoing examples, the command source 20 operated the address generator 24 to produce relative addresses. When the address generator 24 produces absolute addresses, the address-conversion operations are the same, but the offset values that they use are different.

To generate an address in on-screen segment 50 when the address generator 24 produces absolute addresses, the offset value $O_s$ or $O_d$ is 0 instead of the serial position of the upper left corner of on-screen segment 50. To generate an address in off-screen segment 51, the offset value $O_s$ or $O_d$ is less than the serial position of the beginning location of the off-screen segment 51. Specifically, it assumes the following value:

$$O' = O - x_{a0} - y_{a0} w_{os},$$

where O is the serial position of the beginning location in the off-screen segment, O′ is the offset value when absolute values are used, $x_a$ is the x component of the absolute address of the upper-left location in the occluded on-screen segment, $y_a$ is the y component of that location, and $w_{os}$ is the width of the occluded on-screen segment. With this difference, the circuitry operates with absolute addresses in a manner the same as that in which it operates with relative addresses.

The present invention makes off-screen-memory use very efficient because it stores data in addresses that follow each other in a simple scan of that memory. When the first few windows are opened, therefore, storage for the data for one occluded region can simply begin at the memory location immediately following that in which the storage of data for previous occluded window ends. The only consideration is whether the total number of unused locations in the off-screen part of the memory is great enough; shape is not a factor.

After a number of windows have closed, however, gaps of unused space of various sizes typically appear. Even though the total number of unused locations may be great enough to store the contents of a newly occluded segment, it may not be possible simply to write those contents into a sequence of vacated off-screen memory locations, because there may be no individual vacated sequence long enough to store the data for the newly occluded space. It may therefore be desirable to rearrange storage segments within the off-screen part 46 of the memory.

The circuitry of FIG. 1 can be used for this purpose, too. The command source 20 operates the sequencer 22 and address generator 24 as usual to sequence through the two-dimensional addresses of the on-screen locations that would contain the stored data if the occluded region were again to be made visible on the display device, but it employs the width of the on-screen occluded segment both as the source width and as the destination width. For the source offset value it uses the serial position of the first location in the off-screen segment in which the data are currently being stored. For the destination offset value it uses the first location in the off-screen segment to which those data are to be transferred. These offsets are adjusted by $x_a + y_a w_{os}$, as was stated above, if the address generator 24 produces absolute addresses.

With appropriate changes of parameters, the same operations can be employed to transfer data between on-screen segments.

Figure 4:
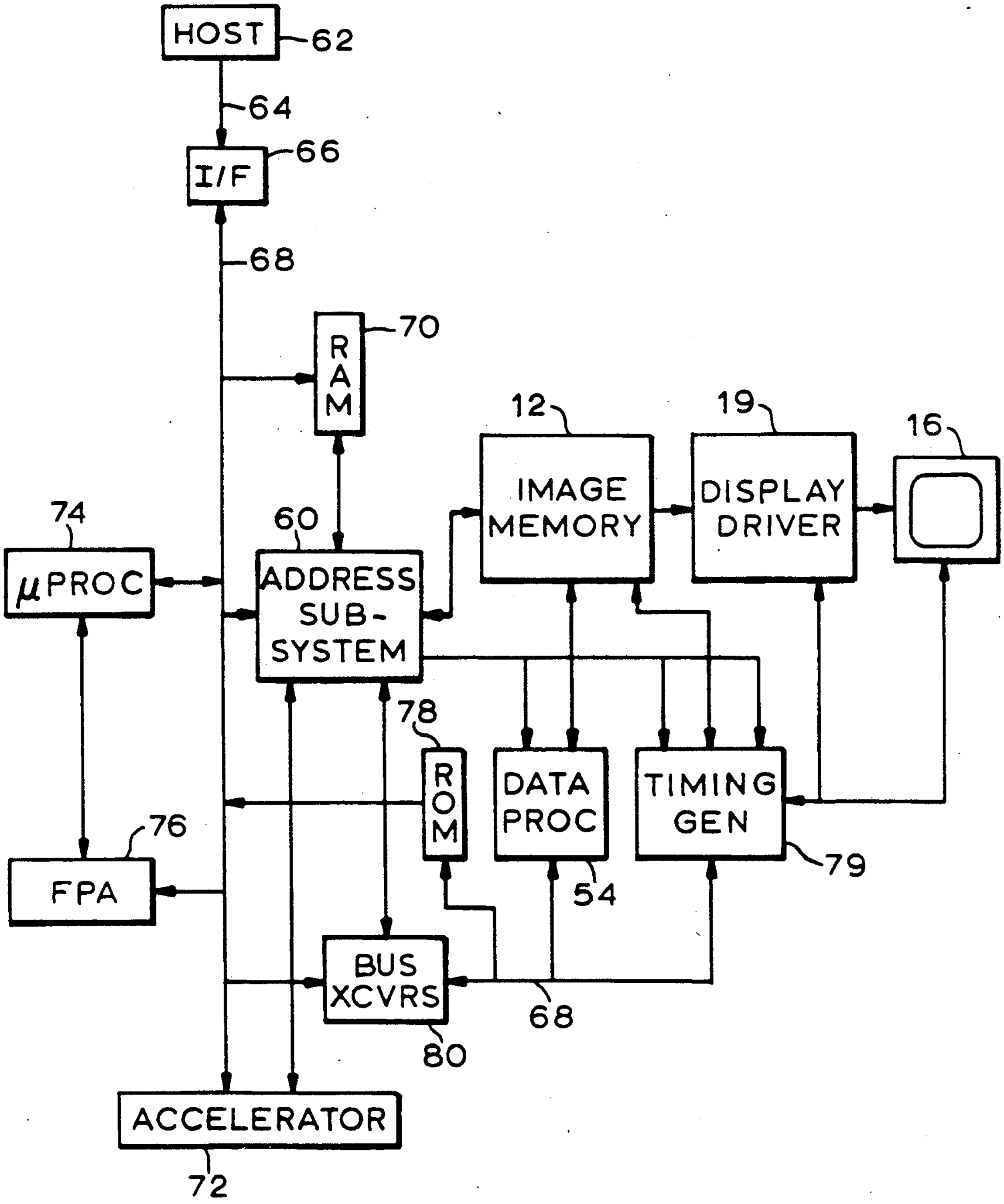
FIG. 4 is a block diagram of an exemplary environment for the system of the present invention.

FIG. 4 depicts an example of a subsystem in which the teachings might be employed. The image memory 12, the display driver 19, the display unit 16, and the data processor 54 are shown separately, and the remaining elements of FIG. 1, with the exception of the command source 20, are depicted as an address subsystem 60. The remaining elements of FIG. 4 perform the functions of the command source 20 of FIG. 1.

Specifically, a host computer 62 runs the applications program whose output is to be presented on the display unit 16. The applications program performs its operations and generates commands in accordance with a common graphics protocol, such as X11. A further software layer specific to the hardware of this graphics subsystem translates the standard graphics commands into instructions that can be performed by the subsystem of FIG. 4. The host 62 transmits these instructions over its bus 64, and an interface circuit 66 converts them to comply with the protocol of a graphics-subsystem bus 68. A read/write memory 70 receives some of these instructions directly, while others, which concern operations on three-dimensional objects, are converted by an accelerator processor 72 into instructions that deal with corresponding two-dimensional projections of the three-dimensional objects. The accelerator 72 stores the resulting instructions in the read/write memory 70.

A main subsystem processor 74, with the assistance of a floating-point accelerator 76, obtains the instructions from the read/write memory 70 and operates the address subsystem 60 accordingly. The read-only memory 78 includes instructions that the accelerators 72 and 76, the processor 74, and the host 62 execute for diagnostic purposes, and it may include instructions for the host 62 as well.

Completing the subsystem are a timing generator 79, which provides signals for overall timing, and transceivers 80, which may be interposed in the bus 68 for buffering purposes.

The arrangement of FIG. 4 is simply an exemplary environment for the system of FIG. 1, which clearly can be employed in many other environments.

By employing the teachings of the present invention, one can avoid not only the low efficiency that results from simple address translation but also the complexities and consequent slow operation of tiling schemes. It is thus apparent that the present invention constitutes a significant advance in the art.

We claim:

1. A display system comprising:

A. an on-screen memory containing a two-dimensional array of memory locations for storing image data representing the values of image pixels;

B. display means for repetitively scanning the contents of the on-screen memory and generating a visual display of the image that they represent;

C. an off-screen memory containing a two-dimensional array of memory locations for storing image data representing the values of image pixels;

D. an address circuit comprising:

i. means for receiving input signals that represent (a) as an off-screen-segment offset value, the position of an off-screen segment of the off-screen memory, the off-screen segment having a beginning location, (b) a location in a corresponding on-screen segment of the on-screen memory as x and y components of the address of the location, (c) the width of the on-screen segment, (d) an on-screen-segment offset value, and (e) the width of the off-screen memory;

ii. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

iii. a multiplier for multiplying the y component of the width that the first multiplexer output represents and generating as the product signal a signal representative of the resultant product;

iv. a second multiplexer, including two input ports, for receiving at one input port the signals representing the off-screen-segment offset value, for receiving at its other input port signals representing the on-screen-segment offset values, and for selectively forwarding as a second multiplexer output the signals received at one of its input ports;

v. addition means for adding the product, the x component, and the offset value that the second multiplexer output represents and generating as the address signal a signal representing the resultant sum; and vi. means for applying the address signal to the off-screen memory and to the on-screen memory; and E. access means for reading from and writing to the on-screen-memory and off-screen-memory locations that the address signal represents.

2. A display system as defined in claim 1 wherein the address circuit further includes an address generator for generating and applying to the means for receiving input signals the input signals that represent a location in an on-screen segment of the on-screen memory as x and y components of the address thereof.

3. A display system comprising:

A. an on-screen memory containing a two-dimensional array of memory locations for storing image data representing the values of image pixels;

B. display means for repetitively scanning the contents of the on-screen memory and generating a visual display of the image that they represent;

C. an off-screen memory containing a two-dimensional array of memory locations for storing image data representing the values of image pixels;

D. an address circuit comprising:

i. means for receiving input signals that represent (a) as an off-screen-segment offset value, the position of an off-screen segment of the off-screen memory, the off-screen segment having a beginning location, (b) a location in a corresponding on-screen segment of the on-screen memory as x and y components of the address of the location, (c) the width of the on-screen segment, (d) an on-screen segment offset value, and (e) the width of the off-screen memory;

ii. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

iii. a multiplier for multiplying the y component by the width that the first multiplexer outputs represents and generating as the product signal a signal representative of the resultant product;

iv. a second multiplexer, including two input ports, for receiving at one input port the signals representing the off-screen-segment offset value, for receiving at its other input port signals representing the on-screen-segment offset value, and for selectively forwarding as a second multiplexer output the signals received at one of its input ports;

v. a first adder for adding the x component to the offset value that the second multiplexer output represents and generating a signal representing a first sum;

vi. a second adder for adding the first sum to the product and generating as the address signal a signal representing the resultant sum; and vii. means for applying the address signal to the off-screen memory and to the on-screen memory; and E. access means for reading from and writing to the on-screen-memory and off-screen-memory locations that the address signal represents.

4. A display system comprising:

A. an on-screen memory containing a two-dimensional array of memory locations for storing image data representing the values of image pixels;

B. display means for repetitively scanning the contents of the on-screen memory and generating a visual display of the image that they represent;

C. an off-screen memory containing a two-dimensional array of memory locations for storing image data representing the values of image pixels;

D. an address circuit comprising:

i. an address generator for generating on-screen-address signals representing a location in an on-screen segment of the on-screen memory as x and y components of the address of the location;

ii. means for receiving as input signals the on-screen-address signals and signals that represent (a) as an off-screen-segment offset value, the position of a corresponding off-screen segment of the off-screen memory, the off-screen segment having a beginning location, (b) the width of the on-screen segment, (c) an on-screen segment offset value, and (d) the width of the off-screen memory;

iii. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

iv. a multiplier for multiplying the y component by the width that the first multiplexer output represents and generating as the product signal a signal representative of the resultant product;

v. a second multiplexer, including two input ports, for receiving at one input port the signals representing the off-screen-segment offset value, for receiving at its other input port signals representing the on-screen-segment offset value, and for selectively forwarding as a second multiplexer output the signals received at one of its input ports;

vi. a first adder for adding the x component to the offset value that the second multiplexer output represents and generating a signal representing a first sum;

vii. a second adder for adding the first sum to the product and generating as the address signal a signal representing the resultant sum; and viii. means for applying the address signal to the off-screen memory and to the on-screen memory;

E. access means for reading from and writing to the on-screen-memory and off-screen-memory locations that the address signal represents.

5. An address circuit for use in a display system that includes an on-screen memory containing a two-dimensional array of memory locations for storing image data representing the values of image pixels, display means for repetitively scanning the contents of the on-screen memory and generating a visual display of the image that they represent, an off-screen memory containing a two-dimensional array of memory locations for storing image data representing the values of image pixels, and access means for performing at least one of (i) reading from and (ii) writing to an off-screen-memory location represented by an address signal applied to the off-screen memory, the address circuit comprising:

A. means for receiving input signals that represent (i) as an off-screen-segment offset value, the position of an off-screen segment of the off-screen memory, the off-screen segment having a beginning location, (ii) a location in a corresponding on-screen segment of the on-screen memory as x and y components of the address of the location, (iii) the width of the on-screen segment, (iv) an on-screen-segment offset value, and (v) the width of the off-screen memory;

B. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

C. a multiplier for multiplying the y component by the width that the first multiplexer output represents and generating as the product signal a signal representative of the resultant product;

D. a second multiplexer, including two input ports, for receiving at one input port the signals representing the off-screen-segment offset value, for receiving at its other input port signals representing the on-screen-segment offset value, and for selectively forwarding as a second multiplexer output the signals received at one of its input ports;

E. addition means for adding the product, the x component, and the offset value that the second multiplexer output represents and generating as the address signal a signal representing the resultant sum; and F. means for applying the address signal to the off-screen memory and to the on-screen memory.

6. An address circuit as defined in claim 5 further including an address generator for generating and applying to the means for receiving input signals the input signals that represent a location in an on-screen segment of the on-screen memory as x and y components of the address thereof.

7. An address circuit for use in a display system that includes an on-screen memory containing a two-dimensional array of memory locations for storing image data representing the values of image pixels, display means for repetitively scanning the contents of the on-screen memory and generating a visual display of the image that they represent, an off-screen memory containing a two-dimensional array of memory locations for storing image data representing the values of image pixels, and access means for performing at least one of (i) reading from and (ii) writing to an off-screen-memory location represented by an address signal applied to the off-screen memory, the address circuit comprising:

A. means for receiving input signals that represent (i) as an off-screen-segment offset value, the position of an off-screen segment of the off-screen memory, the off-screen segment having a beginning location (ii) a location in a corresponding on-screen segment of the on-screen memory as x and y components of the address of the location, (iii) the width of the on-screen segment, (iv) an on-screen segment offset value, and (v) the width of the off-screen memory;

B. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

C. a multiplier for multiplying the y component by the width that the first multiplexer output represents and generating as the product signal a signal representative of the resultant product;

D. a second multiplexer, including two input ports, for receiving at one input port the signals representing the off-screen-segment offset value, for receiving at its other input port signals representing the on-screen-segment offset value, and for selectively forwarding as a second multiplexer output the signals received at one of its input ports;

E. a first adder for adding the x component to the offset value that the second multiplexer output represents and generating a signal representing a first sum;

F. a second adder for adding the first sum to the product and generating as the address signal a signal representing the resultant sum; and G. means for applying the address signal to the off-screen memory and to the on-screen memory.

8. An address circuit for use in a display system that includes an on-screen memory containing a two-dimensional array of memory locations for storing image data representing the values of image pixels, display means for repetitively scanning the contents of the on-screen memory and generating a visual display of the image that they represent, an off-screen memory containing a two-dimensional array of memory locations for storing image data representing the values of image pixels, and access means for performing at least one of (i) reading from and (ii) writing to an off-screen-memory location represented by an address signal applied to the off-screen memory, the address circuit comprising:

A. an address generator for generating on-screen-address signals representing a location in an on-screen segment of the on-screen memory as x and y components of the address of the location;

B. means for receiving as input signals the on-screen address signals and signals that represent (i) as an off-screen-segment offset value, the position of the corresponding off-screen segment of the off-screen memory, the off-screen segment having a beginning location, (ii) the width of the on-screen segment, (iii) an on-screen segment offset value, and (iv) the width of the off-screen memory;

C. a first multiplexer, including two input ports, for receiving at one input port the signals representing the width of the on-screen segment, for receiving at its other input port the signals representing the width of the off-screen memory, and for selectively forwarding as a first multiplexer output the signals received at one of its input ports;

D. a multiplier for multiplying the y component by the width that the first multiplexer output represents and generating as the product signal a signal representative of the resultant product;

E. a second multiplexer, including two input ports, for receiving at one input port the signals representing the off-screen-segment offset value, for receiving at its other input port signals representing the on-screen-segment offset value, and for selectively forwarding as a second multiplexer output the signals received at one of its input ports;

F. a first adder for adding the x component to the offset value that the second multiplexer output represents and generating a signal representing a first sum;

G. a second adder for adding the first sum to the product and generating as the address signal a signal representing the resultant sum; and H. means for applying the address signal to the off-screen memory and to the on-screen memory.

* * * * *